US012696934B2

(12) United States Patent
Courbat et al.

(10) Patent No.: US 12,696,934 B2
(45) Date of Patent: Aug. 4, 2026

(54) AEROSOL-GENERATING ARTICLE WITH LIQUID-CONVEYING SUSCEPTOR ASSEMBLY

(71) Applicant: Philip Morris Products S.A., Neuchatel (CH)

(72) Inventors: Jerome Christian Courbat, Cortaillod (CH); Oleg Fursa, Gempenach (CH); Oleg Mironov, Cudrefin (CH); Ozgur Ozsun, Kilchberg (CH)

(73) Assignee: Philip Morris Products S.A., Neuchatel (CH)

( * ) Notice: Subject to any disclaimer, the term of this patent is extended or adjusted under 35 U.S.C. 154(b) by 749 days.

(21) Appl. No.: 17/998,086

(22) PCT Filed: May 12, 2021

(86) PCT No.: PCT/EP2021/062568
§ 371 (c)(1),
(2) Date: Nov. 7, 2022

(87) PCT Pub. No.: WO2021/228910
PCT Pub. Date: Nov. 18, 2021

(65) Prior Publication Data
US 2023/0240369 A1 Aug. 3, 2023

(30) Foreign Application Priority Data
May 15, 2020 (EP) .................................... 20175045

(51) Int. Cl.
*A24F 40/465* (2020.01)
*A24F 40/10* (2020.01)
(Continued)

(52) U.S. Cl.
CPC ............ *A24F 40/465* (2020.01); *A24F 40/10* (2020.01); *A24F 40/42* (2020.01); *A24F 40/44* (2020.01); *H05B 6/108* (2013.01); *A24F 40/57* (2020.01)

(58) Field of Classification Search
CPC ........ A24F 40/465; A24F 40/10; A24F 40/42; A24F 40/44
See application file for complete search history.

(56) References Cited

U.S. PATENT DOCUMENTS 5,613,505 A 3/1997 Campbell et al.
2015/0245669 A1* 9/2015 Cadieux .................. A24F 40/44 131/329
(Continued)

FOREIGN PATENT DOCUMENTS

CN 107072315 A 8/2017
EP 2 327 318 A1 6/2011
(Continued)

OTHER PUBLICATIONS

International Search Report & Written Opinion issued Aug. 13, 2021 in PCT/EP2021/062568, filed on May 12, 2021, 18 pages.
(Continued)

*Primary Examiner* — Christopher M Rodd
*Assistant Examiner* — Jennifer A Kessie
(74) *Attorney, Agent, or Firm* — Oblon, McClelland, Maier & Neustadt, L.L.P.

(57) ABSTRACT

An aerosol-generating article is provided for an inductively heatable aerosol-generating device, the article including a liquid reservoir to store aerosol-forming liquid; and a liquid-conveying susceptor assembly to convey the aerosol-forming liquid into a region outside the liquid reservoir and for inductively heating the aerosol-forming liquid under an influence of an alternating magnetic field to generate an
(Continued)

aerosol, the assembly including a filament bundle of inductively heatable filaments including first and second soaking sections and an intermediate section therebetween, the soaking sections being arranged at least partially in the liquid reservoir and the intermediate section being arranged outside the liquid reservoir, the filaments being parallel to each other along the intermediate section, and the soaking sections differing from each other in at least one of a number of fibers therein, a surface property of the filaments therein, or a length thereof.

13 Claims, 4 Drawing Sheets

(51) Int. Cl.

| | |
|---|---|
| ***A24F 40/42*** | (2020.01) |
| ***A24F 40/44*** | (2020.01) |
| ***A24F 40/57*** | (2020.01) |
| ***H05B 6/10*** | (2006.01) |

(56) References Cited

U.S. PATENT DOCUMENTS

| | | | | |
|---|---|---|---|---|
| 2016/0109115 A1* | 4/2016 | Lipowicz | F22B 1/282 392/395 |
| 2017/0258132 A1* | 9/2017 | Rostami | A24F 40/42 |
| 2018/0125119 A1 | 5/2018 | Cadieux et al. | |
| 2019/0313701 A1 | 10/2019 | Cadieux et al. | |
| 2021/0093006 A1 | 4/2021 | Potter et al. | |

FOREIGN PATENT DOCUMENTS

| | | | |
|---|---|---|---|
| EP | 3 110 270 | A1 | 1/2017 |
| EP | 3 110 270 | B1 | 12/2019 |
| JP | 2017-506915 | A | 3/2017 |
| KR | 10-2016-0127793 | | 11/2016 |
| KZ | 32440 | B | 10/2017 |
| RU | 2 646 557 | C2 | 3/2018 |
| WO | WO 2015/175568 | A1 | 11/2015 |
| WO | WO 2016/061166 | A1 | 4/2016 |
| WO | WO 2019/145710 | A1 | 8/2019 |

OTHER PUBLICATIONS

International Preliminary Report on Patentability issued Feb. 8, 2022 in PCT/EP2021/062568, filed on May 12, 2021, 20 pages.

Combined Russian Office Action and Search Report issued Aug. 23, 2024 in Russian Patent Application No. 2022132672/03 (with English Translation of Office Action only), 9 pages.

Japanese Office Action issued Mar. 2, 2025 in Japanese Patent Application No. 2022-569088 (with unedited computer-generated English Translation), 4 pages.

Office Action dated Jan. 6, 2026, issued in corresponding Chinese patent application No. 202180035006.0 (with English translation).

Office Action dated May 15, 2026 issued in corresponding Korean patent application No. 10-2022-7042568 (with English translation).

* cited by examiner

AEROSOL-GENERATING ARTICLE WITH LIQUID-CONVEYING SUSCEPTOR ASSEMBLY

The present disclosure relates to an aerosol-generating article comprising a liquid-conveying susceptor assembly. The invention further relates an aerosol-generating system comprising such an aerosol-generating article and an aerosol-generating device for use with the article.

Generating inhalable aerosols by heating aerosol-forming liquids is generally known from prior art. For this, a liquid aerosol-forming substrate may be conveyed by a wick element from a liquid reservoir into a region outside the reservoir, where it may be vaporized by a heater and exposed to an air path to be subsequently drawn out as an aerosol. The heater may be an inductive heater. In particular, the wick element may be an inductively heatable wick element which comprises a susceptor material and, thus, is capable to perform both functions: wicking and heating. Hence, when being exposed to an alternating magnetic field, the wick element heats up due at least one of eddy currents or magnetic hysteresis losses which are induced in the wick element depending on its magnetic and electrical properties. Accordingly, such a wick element may also be considered as liquid-conveying susceptor or susceptor assembly.

The liquid-conveying susceptor or susceptor assembly and the reservoir together may be part of an aerosol-generating article that is configured for use with an inductively heating aerosol-generating device. The device may comprise a receiving cavity for receiving the article as well as an induction source which is configured and arranged to generate an alternating magnetic field in the susceptor assembly when the article is received in the cavity in order to vaporize the aerosol-forming liquid conveyed by the susceptor assembly.

There are various configurations of the susceptor assembly, such as mesh configurations. However, many of these configurations are complex and thus laborious to manufacture. Furthermore, many of these configurations have only a limited wicking capacity.

Therefore, it would be desirable to have an aerosol-generating article and an aerosol-generating system comprising a liquid-conveying susceptor assembly with the advantages of prior art solutions, whilst mitigating their limitations. In particular, it would be desirable to have an aerosol-generating article and an aerosol-generating system including a liquid-conveying susceptor assembly which is easy and inexpensive to manufacture and which provides an improved wicking capacity.

According to an aspect of the present invention, there is provided an aerosol-generating article for use with an inductively heating aerosol-generating device. The article comprises a liquid reservoir for storing aerosol-forming liquid. The article further comprises a liquid-conveying susceptor assembly for conveying aerosol-forming liquid from the liquid reservoir into a region outside the liquid reservoir as well as for inductively heating the aerosol-forming liquid under the influence of an alternating magnetic field in order to generate an aerosol. The susceptor assembly comprises a filament bundle of a plurality of inductively heatable filaments. The filament bundle comprises a first soaking section, a second soaking section and an intermediate section between the first soaking section and the second soaking section. The first soaking section and the second soaking section are each arranged at least partially in the liquid reservoir and the intermediate section is arranged in a region outside the liquid reservoir. Along at least the intermediate section the plurality of filaments are arranged parallel to each other.

As used herein, the term "aerosol-generating article" refers to a consumable for usage with an inductively heating aerosol-generating device, in particular a consumable to be discarded after a single use. For example, the article may be a cartridge to be inserted into an inductively heating aerosol-generating device. Preferably, the aerosol-generating article comprises at least a first aerosol-forming liquid that is intended to be heated rather than combusted and that, when heated, releases volatile compounds that can form an aerosol.

According to the invention it has been found that a susceptor assembly which comprises a filament bundle having first and a second soaking section has an enhanced liquid conveying capacity as both soaking sections may be arranged in the liquid reservoir such as to convey aerosol-forming liquid from two sides towards the intermediate section, where the conveyed liquid may be vaporized and exposed to an air path to be drawn out as an aerosol.

In addition, it has been found that a filament bundle having its filaments arranged in parallel order to each other at least in the intermediate section is easy and inexpensive to manufacture. Basically, such a susceptor assembly may be manufactured by taking a plurality of individual filaments which are aligned next to each other in a substantially parallel order and by subsequently bundling the plurality of filaments in one portion, that is, the intermediate section, to fix the parallel order. Accordingly, the intermediate section may also be denoted as parallel-bundle portion.

As used herein, the term "parallel" refers to a substantially parallel arrangement including small deviations from a perfect parallel arrangement by at most 5 degrees, in particular by at most 2 degree, preferably at most 1 degree, more preferably by at most 0.5 degree. That is, in the intermediate section the filaments may diverge from each other by at most 5 degrees, in particular by at most 2 degree, preferably at most 1 degree, more preferably by at most 0.5 degree.

Filaments are particularly suited for conveying liquids because they inherently provide a capillary action. Moreover, in the filament bundle, the capillary action is further enhanced due to the narrow spaces formed between the pluralities of filaments when being bundled. In particular, this applies for the intermediate section of the filament bundle along which the capillary action is constant as the narrow spaces between the filaments do not vary along that portion.

Due to the filaments being inductively heatable, the filament bundle is capable to perform both functions: conveying and heating an aerosol-forming liquid. Advantageously, this double function allows for a very material saving and compact design of the susceptor assembly without separate means for conveying and heating. In addition, there is a direct thermal contact between the heat source, that is, the filaments and the aerosol-forming liquid adhering to the filaments. Unlike in case of a heater in contact with a saturated wick, a direct contact between the filaments and a small amount of liquid advantageously allows for flash heating, that is, for a fast onset of evaporation.

As used herein, the term "inductively heatable filament" refers to filaments comprising a susceptor material that is capable to convert electromagnetic energy into heat when subjected to an alternating magnetic field. This may be the result of at least one of hysteresis losses or eddy currents induced in the susceptor material, depending on its electrical and magnetic properties. Hysteresis losses occur in ferromagnetic or ferrimagnetic susceptor materials due to magnetic domains within the material being switched under the influence of an alternating electromagnetic field. Eddy currents are induced in electrically conductive susceptor materials. In case of an electrically conductive ferromagnetic or ferrimagnetic susceptor material, heat is generated due to both, eddy currents and hysteresis losses.

The filament bundle may be an unstranded filament bundle. In an unstranded filament bundle, the filaments of the filament bundle run next to each other without crossing each other, preferably along the entire length extension of the filament bundle. In particular in the intermediate section, the filaments run parallel to each other without crossing each other. Likewise, the filament bundle may comprise a stranded portion, in which the filaments of the filament bundle are stranded. The stranded portion may be part of at least one of the first soaking section or the second soaking section. A stranded portion may enhance the mechanical stability of the filament bundle.

In general, the filament bundle may be a linear filament bundle, that is, a substantially straight, non-curved or non-bent filament bundle. This configuration does not exclude little bending of the filament bundle, that is, large curvature radii along the length extension of the filament bundle. As used, large curvature radii may include curvature radii being 10 times, in particular 20 times or 50 times or particular 100 times larger than the total length of the filament bundle.

Preferably, the filament bundle is curved. In particular the filament bundle may be curved such that the filament bundle comprises an apex in the intermediate section. The first soaking section and the second soaking section may extend substantially in one hemisphere around the apex, in particular in one hemicycle around the apex, preferably substantially in the same direction. As used herein, the term "substantially in the same direction" includes any configurations having a diversions angle between the first soaking section and the second soaking section in a range from 0 degrees to less than the 180 degrees, in particular in a range between 0 degrees and 120 degrees, more particularly in a range between 0 degrees and 90 degrees, preferably in a range between 0 degrees and 60 degrees, more preferably in a range between 0 degrees and 45 degrees, even more preferably in a range between 0 degrees and 30 degrees, most preferably in a range between 0 degrees and 10 degrees.

In this configuration, the filament bundle may have a curvature radius in a range between 0.5/Pi times and 10 times, in particular between 1/Pi times and 5 times of the total length of the filament bundle. Here, Pi denotes Archimedes' constant, that is, the ratio of the circumference to the diameter of a circle.

Any of these configurations including an apex in the intermediate section enables to readily expose the apex to an alternating magnetic field by inserting the apex into an induction coil, for example, such that induction coil the induction coil surrounds the apex in the intermediate section. As a consequence, the apex, that is, at least part of the intermediate section may be used as a heating section, in particular as a heating tip for heating aerosol-forming liquid conveyed from the first and the second soaking section to the intermediate section.

As an example, the filament bundle may be substantially U-shaped or C-shaped or V-shaped. In particular, the first soaking section and the second soaking section each may form at least partially an arm of the U-shape or the C-shape or the V-shape, respectively. The intermediate section may form a base of the U-shape or the C-shape or the V-shape, respectively. Any of these shapes may be used to realize a non-curved filament bundle as described above In order to realize an equal supply of aerosol-forming liquid from both soaking sections, the intermediate section may be symmetrically located between the first soaking section and the second soaking section. It is also possible, that intermediate section is a symmetrically located between the first soaking section and the second soaking section. The latter configuration may be used to realize an unequal supply of aerosol-forming liquid from the first and the second soaking section.

Preferably, the first soaking section may be located at least partially at a first end portion of the filament bundle. Likewise, the second soaking section may be located at least partially at a second end portion of the filament bundle. Due to the first soaking section and the second soaking section been arranged at least partially at a respective end portion of the filament bundle, the respective soaking section may be easily inserted into the liquid reservoir.

The aerosol-generating article may be an aerosol-generating article for single use or an aerosol-generating article for multiple uses. In the latter case, the aerosol-generating article may be refillable. That is, the liquid reservoir may be refillable with an aerosol-forming liquid. In either case, the aerosol-generating article may comprise an aerosol-forming liquid contained in the liquid reservoir.

As used herein, the term "aerosol-forming liquid" relates to a liquid capable of releasing volatile compounds that can form an aerosol upon heating the aerosol-forming liquid. The aerosol-forming liquid may contain both, solid and liquid aerosol-forming material or components. The aerosol-forming liquid may comprise a tobacco-containing material containing volatile tobacco flavor compounds, which are released from the liquid upon heating. Alternatively or additionally, the aerosol-forming liquid may comprise a non-tobacco material. The aerosol-forming liquid may further comprise an aerosol former. Examples of suitable aerosol formers are glycerin and propylene glycol. The aerosol-forming liquid may also comprise other additives and ingredients, such as nicotine or flavourants. In particular, the aerosol-forming liquid may include water, solvents, ethanol, plant extracts and natural or artificial flavors. The aerosol-forming liquid may be a water-based aerosol-forming liquid or an oil-based aerosol-forming liquid.

The liquid reservoir may comprise a single compartment for storing aerosol-forming liquid. This configuration may be preferred in case the aerosol-generating article only contains a single aerosol-forming liquid.

Likewise, the article may contain or may be configured to contain a plurality of aerosol-forming liquids, for example, a first aerosol-forming liquid and a second aerosol-forming liquid. In the latter configuration, the liquid reservoir comprises a first compartment and a second compartment, each configured to contain a respective aerosol-forming liquid. As an example, the first aerosol-forming liquid may be a water-based aerosol-forming liquid and the second aerosol-forming liquid may be an oil-based aerosol-forming liquid.

Advantageously, the filament bundle may be utilized to soak aerosol-forming liquid from both compartments and to subsequently vaporize the aerosol-forming liquids from both compartments in the intermediate section. For that purpose, the first soaking section may be arranged at least partially in the first compartment and the second soaking section may be arranged at least partially in the second compartment.

In general, the first compartment is fluidly may be in direct fluid communication with each other. This configuration may come into account when the first compartment and the second compartment contain the same aerosol-forming liquid. In this case, since the filament bundle is immersed with the first and the second soaking section into the first and the second compartment, respectively, the susceptor assembly provides an enhanced liquid conveying capacity as compared to susceptor assemblies having only one soaking section In another configuration, the first compartment may be fluidly separated from the second compartment. This configuration may be used to fill the first compartment with a first aerosol-forming liquid and the second compartment with a second aerosol-forming liquid that is preferably different from the first aerosol-forming liquid. Accordingly, the susceptor assembly may be used to convey and vaporize different types of aerosol-forming liquids at the same time. Even in case the first and the second aerosol-forming liquid are immiscible, they are nonetheless vaporized simultaneously such as to from one aerosol composed of droplets combining both liquids. Advantageously, this enhances the variety of a user's experience. It is also possible that the first aerosol-forming liquid and the second aerosol-forming liquid are the same.

Accordingly, the aerosol-generating article may comprise a first aerosol-forming liquid contained in the first compartment, and a second aerosol-forming liquid contained in the second compartment. As mentioned above, the aerosol-generating article may be an aerosol-generating article for single use or an aerosol-generating article for multiple uses. In the latter case, the first and the second compartment each may be configured such as to be refillable with a respective aerosol-forming liquid, in particular with a first aerosol-forming liquid and a second aerosol-forming liquid, respectively.

In order to keep the filaments together, at least part of the filament bundle may be bunched by a ferrule or a bushing or a harness. In particular, at least part of one of the first soaking section and the second soaking section may be bunched by a ferrule or a bushing or harness. Likewise, at least part of the intermediate section may be bunched by a ferrule or a bushing or harness. The ferrule or the bushing or the harness may comprise a sheath member. For example, the bushing may be a separating wall separating a liquid reservoir from a vaporization zone. Likewise, the at least part of the intermediate section may be bunched by a gasket or an O-ring. The filaments may be kept together by crimping or overmolding, that is, by a crimping member or an overmolded member. It is also possible that the filaments are kept together by welding them together at one place in the intermediate section, preferably in the middle of the intermediate soaking section. Likewise, the filaments may be kept together by welding them together at an extremity of at least one of the first soaking section or the second soaking section. In these configurations, capillary action still occurs along the non-welded portion of the filament bundle.

In order to control the liquid conveying properties, in particular the liquid conveying capacity, the various sections of the filament bundle, in particular the first soaking section and the second soaking section, may differ from each other in at least one property. This may enable to control the respective amount of aerosol-forming liquid conveyed from different compartments of the liquid reservoirs and thus to control the composition of the aerosol. Advantageously, this may further enhance the variety of the user's experience.

For example, the number of fibers in the first soaking section may be different from the number of fibers in the second soaking section. Due the difference in the number of filaments, the first soaking section and the second soaking section may have a different liquid conveying capacity. This may result in different amounts of aerosol-forming liquid being conveyed from the first soaking section and the second soaking section, respectively.

Alternatively or in addition, a surface property of the filaments in the first soaking section may be different from a surface property of the filaments in the second soaking section. For example, the filaments in the first soaking section may comprise a liquid-adhesive surface coating that is different from a liquid-adhesive surface coating of the filaments in the second soaking section. In particular, the different liquid-adhesive surface coatings may provide different adhesion strength between the respective aerosol-forming liquid and the filaments of the respective soaking section.

Alternatively or in addition, a length of the first soaking section may be different from a length of the second soaking section. Different lengths of the first and the second soaking section may also result in different liquid conveying capacities of the respective soaking sections.

In general, the first soaking section may have a length of at most 10 percent, 20 percent, 30 percent, 40 percent, 50 percent, 60 percent, of the total length of the filament bundle. Likewise, the second soaking section may have a length of at most 10 percent, 20 percent, 30 percent, 40 percent, 50 percent, 60 percent, of the total length of the filament bundle. These values ensure a sufficient feed of aerosol-forming liquid to the intermediate section.

Accordingly, intermediate section may have a length of at most 10 percent, 20 percent, 30 percent, 40 percent, 50 percent, 60 percent, 70 percent, 80 percent, 90 percent or 100 percent of the total length of the filament bundle.

Vice versa, the length of the intermediate section should be larger enough to ensure sufficient part of the filament bundle being heated and thus to ensure a sufficient amount of aerosol-forming liquid being vaporized in use. Accordingly, the intermediate section may have a length of at least 5 percent, 10 percent, 20 percent, 30 percent, 40 percent, 50 percent, 60 percent, 70 percent, or 80 percent of the total length of the filament bundle.

In in the intermediate section, the mean center-to-center distance between adjacent filaments may be at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. These values of the center-to-center distance are particularly suitable to ensure a sufficient capillary action.

As mentioned further above, at least part of the intermediate section are preferably used as a heating section to be inductively heated in use of the susceptor assembly in order to vaporize aerosol-forming liquid conveyed from the first and second soaking portion to the intermediate portion. While in use the heating section is heated up to temperatures sufficient to vaporize the aerosol-forming liquid, the soaking sections preferably shall remain at temperatures well below the vaporization temperature in order to avoid boiling of the aerosol-forming liquids in the liquid reservoir. Hence, in use the filament bundle comprises a temperature profile along its length extension with sections of higher and lower temperatures. In particular, the filament bundle may comprise a temperature profile showing a temperature increase from the first and second soaking section to the intermediate section or the heating section, respectively, in particular from temperatures below a vaporization temperature to temperatures above the respective vaporization temperature.

As used herein, the term “heating section” denotes a section of the filament bundle which is configured to be exposed to an alternating magnetic field in order to vaporize the aerosol-forming liquid in order to be inductively heated. Likewise, the term “soaking section” denotes a section of the filament bundle which is configured to be immersed into a liquid reservoir.

The temperature profile actually forming up in use of the susceptor assembly—inter alia—depends on the thermal conductivity and the length of the filament bundle. A sufficient temperature gradient between the soaking sections and the intermediate section of the filament bundle requires a certain distance between the soaking sections and the intermediate section. In particular, if the soaking sections are located at opposite end portions of the filament bundle and the intermediate section is arranged in between, a certain total length of the filament bundle is required to have the temperature in the first and second soaking sections below the vaporization temperature.

Accordingly, a total length of the filament bundle may be in a range between 5 millimeter and 70 millimeter, in particular between 10 millimeter and 60 millimeter, preferably between 20 millimeter and 50 millimeter.

The filament bundle may further comprise a fan-out portion at at least one of a first end portion and a second end portion of the filament bundle, in which the filaments diverge from each other. Such a fan-out portion may prove beneficial to facilitate conveyance of aerosol-forming liquid. Advantageously, the filament bundle may comprise two fan-out portions, one at each end portion of the filament bundle.

Preferably, a heating section of the filament bundle is located at least partially at the fan-out portion, in particular overlaps at least partially with the fan-out portion.

The fan-out portion may have a length of at least 5 percent, 10 percent, 20 percent, or 30 percent of a total length of the filament bundle. Vice versa, the fan-out portion may have a length of at most 10 percent, 20 percent, 30 percent, or 40 percent of a total length of the filament bundle.

The filament bundle may further comprise an expanded portion in which the mean center-to-center distance between the filaments is larger than in other portions of the filament bundle along its length extension. In particular, the expanded portion may be part of the intermediate section. Or vice versa, the intermediate portion may be part of the expanded portion. The expanded portion may prove beneficial to facilitate the exposure of the vaporized aerosol-forming liquid into an air path and thus the formation of an aerosol.

In general, the filament bundle may comprise at least a plurality of first filaments including a first susceptor material.

Preferably, the plurality of first filaments are solid material filaments. Solid material filaments are inexpensive and easy to manufacture. In addition, solid material filaments provide a good mechanical stability, thus making the filament bundle robust.

For the same reasons, the plurality of first filaments preferably are single grade material filaments. Accordingly, the plurality of first filaments preferably are made of the first susceptor material.

As mentioned further above, the term “susceptor material” refers to a material that is capable to convert electromagnetic energy into heat when subjected to an alternating magnetic field. This may be the result of at least one of hysteresis losses or eddy currents induced in the susceptor material, depending on its electrical and magnetic properties.

Accordingly, the first susceptor material may be formed from any material that can be inductively heated to a temperature sufficient to generate an aerosol from the aerosol-forming substrate. Therefore, the first susceptor material may comprise or may be made of a material that is at least one of electrically conductive and ferromagnetic or ferrimagnetic, respectively. That is, the first susceptor material may comprise or may be made of one of a ferrimagnetic material, or a ferromagnetic material, or an electrically conductive material, or electrically conductive ferrimagnetic material or electrically conductive ferromagnetic material.

For example, the first susceptor material may comprise or may be made of one of a ferrite, aluminium, iron, nickel, copper, bronze, cobalt, a nickel alloy, plain-carbon steel, stainless steel, ferritic stainless steel, ferromagnetic stainless steel, martensitic stainless steel, or austenitic stainless steel.

The wicking or capillary action generally relies on a reduction in the surface energy of the two separate surfaces, the liquid surface and the solid surface of the filaments. The wicking or capillary action includes an effect that depends on the radius of curvature of both the liquid surface and the filaments. Hence, there may be a need for large surface areas and small radii of curvature, both of which are achieved by the small diameter of the filaments and the brush-like nature of the filament bundle. The radius of curvature of the filaments is important as the liquid wets the filaments.

Accordingly, the plurality of first filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Vice versa, the diameter of the first filaments preferably has a certain minimum that is related to the so-called skin depth. The skin depth is a measure of how far electrical conduction takes place in an electrically conductive susceptor material when being inductively heated. Unlike DC currents, AC currents mainly flow at the ‘skin’ of an electrical conductor between an outer surface of the conductor and a level which is called the skin depth. The AC current density is largest near the surface of the conductor, and decreases with greater depths in the conductor. This phenomenon is known as skin effect which basically is due to opposing eddy currents induced by the alternating magnetic field. Preferably, the plurality of first filaments have a diameter of at least twice the skin depth in order to induce a sufficient amount of eddy currents and thus to generate a sufficient amount of heat energy.

In general, the skin depth is a function of the permeability and the electrical conductivity of the susceptor material as well as of the frequency of the AC driving current or frequency of the alternating magnetic field, respectively. Preferably, the susceptor assembly is operated with a high-frequency alternating magnetic field. As referred to herein, the high-frequency electromagnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

Depending on the materials and the frequency of the alternating magnetic field used, the plurality of first filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

In general, the plurality of first filaments may have any cross-sectional shape suitable for conveying aerosol-forming liquid when being bundled. Accordingly, at least one of, in particular each one of the plurality of first filaments may have a circular, an ellipsoidal, an oval, a triangular, a rectangular, a quadratic, a hexagonal or a polygonal cross-section. Preferably, all first filaments have the same cross-section. It is also possible that one or more filaments of the plurality of first filaments have a cross section that is different from the cross-sections of one or more other filaments of the plurality of first filaments. Preferably, the plurality of first filaments have a circular, an ellipsoidal or an oval cross-section. Advantageously, the latter cross-sectional shapes ensure that the filaments in the filament bundle are only in a line contact with each other, but not in an area contact. Due to the line contact, narrow spaces are formed between the pluralities of filaments on its own which promote the capillary action required for conveying the aerosol-forming liquid.

The plurality of first filaments may be surface treated. In particular, the plurality of first filaments may comprise at least partially a surface coating, for example, an aerosolization enhancing surface coating, a liquid-adhesive surface coating, a liquid repellent surface coating, or an antibacterial surface coating. The aerosolization enhancing surface coating advantageously may in particular 1 enhance the variety of a user's experience. The liquid adhesive surface coating may be beneficial with regard to an enhancement of the capillary action of the filament bundle. The antibacterial surface coating may serve to reduce a bacterial contamination. A liquid repellent coating, in particular at an extremity of the filaments, may avoid liquid dropping.

Depending on the available space, the dimensions of the filaments and the amount of aerosol-forming liquid to be conveyed and heated, the plurality of first filaments in the filament bundle may comprise 3 to 100 first filaments, in particular 10 to 80 first filaments, preferably 20 to 60 first filaments, more preferably 30 to 50 first filaments, for example 40 first filaments.

In addition to the plurality of first filaments, the filament bundle may further comprise a plurality of second filaments including a second susceptor material.

While the first susceptor material of the plurality of first filaments may be optimized with regard to heat loss and thus heating efficiency, the second susceptor material may be advantageously used as temperature marker. For this, the second susceptor material preferably comprises one of a ferrimagnetic material or a ferromagnetic material. In particular, the second susceptor material may be chosen such as to have a Curie temperature corresponding to a predefined heating temperature of the susceptor assembly. At its Curie temperature, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached.

Preferably, the first susceptor material is different from the second susceptor material.

The second susceptor material preferably has a Curie temperature that is lower than 500 degree Celsius. In particular, the second susceptor material may have a Curie temperature below 350 degree Celsius, preferably below 300 degree Celsius, more preferably below 250 degree Celsius, even more preferably below 200 degree Celsius, most preferably below 150 degree Celsius. Preferably, the Curie temperature is chosen such as to be below the boiling point of the aerosol-forming liquid to be vaporized in order to prevent the generation of hazardous components in the aerosol.

Suitable materials for the second susceptor material may include nickel and certain nickel alloys. Likewise, the second susceptor material may comprise one of mu-metal or permalloy. In particular, the second susceptor material may have a relative maximum magnetic permeability of at least 80 or at least 100, more particularly at least 1000, preferably at least 10000 for frequencies up to 50 kHz and a temperature of 25 degrees Celsius.

Apart from that, the plurality of second filaments may have the same or similar properties as described before with regard to the plurality of first filaments.

Accordingly, the plurality of second filaments may be solid material filaments. Furthermore, the plurality of second filaments may be single grade material filaments. In particular, the plurality of second filaments may be made of the second susceptor material.

Likewise, the plurality of second filaments may be surface treated. In particular, the plurality of second filaments may comprise a surface coating, for example, an aerosolization enhancing surface coating, a liquid-adhesive surface coating, a liquid repellent surface coating, or an antibacterial surface coating.

Furthermore, at least one of, in particular each of the plurality of second filaments may have a circular, an ellipsoidal, an oval, a triangular, a rectangular, a quadratic, a hexagonal or a polygonal cross-section.

For the same reasons as discussed above with regard to the plurality of first filaments, the plurality of second filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter. Likewise, the plurality of second filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

In general, the plurality of first filaments and the plurality of second filaments may have the same diameter. As a consequence, the capillary action and the shear rate are uniform throughout the filament bundle. Vice versa, it is also possible that the plurality of first filaments and the plurality of second filaments have a different diameter. Different filament diameters may be used to vary the capillary action throughout the filament bundle.

The plurality of second filaments in the filament bundle may comprise 1 to 100 second filaments, in particular 10 to 80 second filaments, preferably 20 to 60 second filaments, more preferably 30 to 50 second filaments, for example 40 second filaments.

In general, the number of first filaments may be the same as the number of second filaments. However, is also possible that the number of first filaments is different from the number of second filaments. In particular, the number of first filaments may be larger, for example two times or three times or four times or five times or six times or seven times or eight times or nine times or ten times larger than the number of second filaments. This particular holds in case the second filaments are used as temperature makers for which a small number of second filaments is sufficient.

The total number of filaments in the filament bundle may be in a range between 3 and 100 filaments, in particular between 10 and 80 filaments, preferably between 20 and 60 filaments, more preferably between 30 and 50 filaments, for example 40 filaments.

The plurality of first filaments and the plurality of second filaments may be substantially equally distributed throughout the filament bundle. A uniform distribution may support a uniform capillary action throughout the filament bundle. Alternatively, it is also possible that the plurality of first filaments and the plurality of second filaments are unequally distributed throughout the filament bundle. For example, the plurality of second filaments may (only) be arranged within a center portion of the filament bundle surrounded by the plurality of first filaments. That is, the plurality of second filaments may form a core portion of the filament bundle and the plurality of first filaments form a sleeve portion of the filament bundle surrounding the core portion. Such a configuration may be advantageous in case the conveying and heating function of the filament bundle is primarily provided by the plurality of first filaments, whereas the plurality of second filaments only serves as temperature marker. Vice versa, the plurality of first filaments may (only) be arranged within a center portion of the filament bundle surrounded by the plurality of second filaments. That is, the plurality of first filaments may form a core portion of the filament bundle and the plurality of second filaments may form a sleeve portion of the filament bundle surrounding the core portion. Likewise, the plurality of first filaments may be arranged in a first portion, in particular in a first half of the filament bundle, whereas the plurality of second filaments may be arranged in a second portion, in particular in a second half of the filament bundle laterally adjacent to the first portion, in particular to the first half. Such a configuration is particularly easy to manufacture. Alternatively, the plurality of second filaments may be randomly distributed throughout the filament bundle. Furthermore, it is possible that the plurality of second filaments may have a length that is different from a length of the plurality of first filaments. In particular, a length of the plurality of second filaments may be shorter than a length of the plurality of first filaments. Vice versa, a length of the plurality of second filaments may be larger than a length of the plurality of first filaments.

The filament bundle may be arranged off-center with regard to a geometrical center axis of the aerosol-generating article. Due to this, the filament bundle may be arrangeable off-center with regard to a symmetry axis of an alternating magnetic field generated by an inductively heating aerosol-generating device into which the aerosol-generating article may be inserted for heating the susceptor assembly. Advantageously, due to the off-center arrangement, that is, an asymmetric arrangement, the filament bundle is arranged in a region of the alternating magnetic field having a higher field density as compared to a symmetric center arrangement. As a consequence, the heating efficiency is enhanced.

In addition, the article may comprise a mouthpiece. As used herein, the term "mouthpiece" means a portion of the article that is placed into a user's mouth in order to directly inhale an aerosol from the article. Preferably, the mouthpiece comprises a filter. The filter may be used to filter out undesired components of the aerosol. The filter may also comprise an add-on material, for example, a flavor material to be added to the aerosol.

The article may have a simple design. The article may have a housing comprising the first liquid reservoir and—if present—the second liquid reservoir. The housing is preferably a rigid housing comprising a material that is impermeable to liquid. As used herein "rigid housing" means a housing that is self-supporting. The housing may comprise or may be made of one of PEEK (polyether ether ketone), PP (polypropylene), PE (polyethylene) or PET (polyethylene terephthalate). PP, PE and PET are particularly cost-effective and easy to mold, in particular to extrude. The aerosol-forming substrate is a substrate capable of releasing volatile compounds that can form an aerosol. The housing may also comprise flexible sections or collapsed sections. The housing may further comprise at least one breather hole for volume compensation.

According to the invention, there is also provided an aerosol-generating system comprising an inductively heating aerosol-generating device and an aerosol-generating article according to the present invention and as described herein. The article is configured for use with the aerosol-generating device. The device comprises a receiving cavity for removably receiving the aerosol-generating article. The device further comprises at least one induction source configured and arranged to generate an alternating magnetic field in the intermediate section of the filament bundle when the article is received in the receiving cavity.

As used herein, the term "aerosol-generating device" is used to describe an electrically operated device that is capable of interacting with at least one aerosol-generating article including at least one aerosol-forming liquid such as to generate an aerosol by inductively heating the susceptor assembly and thus the aerosol-forming liquid within the article. Preferably, the aerosol-generating device is a puffing device for generating an aerosol that is directly inhalable by a user through the user's mouth. In particular, the aerosol-generating device is a hand-held aerosol-generating device.

For generating the alternating magnetic field, the induction source may comprise at least one inductor, preferably at least one induction coil arranged around the receiving cavity.

Preferably, the induction coil is arranged at least around the intermediate section of the filament bundle, when the article is received in the receiving cavity.

The at least one induction coil may be a helical coil or flat planar coil, in particular a pancake coil or a curved planar coil. Use of a flat spiral coil allows a compact design that is robust and inexpensive to manufacture. Use of a helical induction coil advantageously allows for generating a homogeneous alternating magnetic field. As used herein a "flat spiral coil" means a coil that is generally planar, wherein the axis of winding of the coil is normal to the surface in which the coil lies. The flat spiral induction coil can have any desired shape within the plane of the coil. For example, the flat spiral coil may have a circular shape or may have a generally oblong or rectangular shape. However, the term "flat spiral coil" as used herein covers both, coils that are planar as well as flat spiral coils that are shaped to conform to a curved surface. For example, the induction coil may be a "curved" planar coil arranged at the circumference of a preferably cylindrical coil support, for example ferrite core. Furthermore, the flat spiral coil may comprise for example two layers of a four-turn flat spiral coil or a single layer of four-turn flat spiral coil.

The at least one induction coil may be held within one of a main body or a housing of the aerosol-generating device.

The dimensions of the induction coil, in particular the axial length of the induction coil define the dimension of heating section, that is, that part of the intermediate section that is inductively heated in use of the device. The dimensions of the induction coil, in particular the axial length of the induction coil may be chosen such as to generate a desired amount of aerosol. The shorter the heating section, the less aerosol-forming liquid is vaporized and, thus the less aerosol is generated. Accordingly, the dimensions of the induction coil, in particular the axial length of the induction coil may be chosen such the heating section of the filament bundle may have a length of at least 5 percent, 10 percent, 20 percent, 30 percent, 40 percent, 50 percent, 60 percent, 70 percent, or 80 percent of the total length of the filament bundle. Likewise, the heating section of the filament bundle may have a length of at most 10 percent, 20 percent, 30 percent, 40 percent, 50 percent, 60 percent, 70 percent, 80 percent, 90 percent or 100 percent of the total length of the filament bundle.

The aerosol-generating article may be configured such that the filament bundle is arranged off-center with regard to a symmetry axis of the alternating magnetic field generated by the induction source when the article is received in the receiving cavity of the aerosol-generating device. Advantageously, due to the off-center arrangement, that is, an asymmetric arrangement, the filament bundle is arranged in a region of the alternating magnetic field having a higher field density as compared to a symmetric center arrangement. As a consequence, the heating efficiency is enhanced.

The induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

Preferably, the induction source comprises a DC/AC converter connected to the DC power supply including an LC network, wherein the LC network comprises a series connection of a capacitor and the inductor.

The induction source preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the induction source, preferably in a closed-loop configuration, for controlling heating of the aerosol-forming liquid to a predetermined operating temperature. The operating temperature used for heating the aerosol-forming liquid may be in a range between 100 degree Celsius and 300 degree Celsius, in particular between 150 degree Celsius and 250 degree Celsius, for example 230 degree Celsius. These temperatures are typical operating temperatures for heating but not combusting the aerosol-forming substrate.

The controller may be or may be art of an overall controller of the aerosol-generating device. The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C power amplifier or a Class-D power amplifier or Class-E power amplifier. In particular, the induction source may be part of the controller.

The aerosol-generating device may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source.

The aerosol-generating device may further comprise a flux concentrator arranged around at least a portion of the induction coil and configured to distort the alternating magnetic field of the at least one inductive source towards receiving cavity. Thus, when the article is received in the receiving cavity, the alternating magnetic field is distorted towards the filament bundle, in particular towards the heating section of the filament bundle. Preferably, the flux concentrator comprises a flux concentrator foil, in particular a multi-layer flux concentrator foil.

Further features and advantages of the aerosol-generating system according to the present invention have already been described with regard to the aerosol-generating article according to the present invention and thus equally apply.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating article for use with an inductively heating aerosol-generating device, the article comprising a liquid reservoir for storing aerosol-forming liquid, and a liquid-conveying susceptor assembly for conveying aerosol-forming liquid from the liquid reservoir into a region outside the liquid reservoir and for inductively heating the aerosol-forming liquid under the influence of an alternating magnetic field to generate an aerosol, the susceptor assembly comprising a filament bundle of a plurality of filaments, the filament bundle comprising a first soaking section, a second soaking section and an intermediate section between the first soaking section and the second soaking section, wherein the first soaking section and the second soaking section are each arranged at least partially in the liquid reservoir and the intermediate section is arranged in a region outside the liquid reservoir, wherein along at least the intermediate section the plurality of filaments are arranged parallel to each other.

Example Ex2: Article according to example Ex1, wherein the filament bundle is curved.

Example Ex3: Article according to any one of the preceding examples, wherein the filament bundle is substantially U-shaped or C-shaped or V-shaped.

Example Ex4: Article according to example Ex3, wherein the first soaking section and the second soaking section each form at least partially an arm of the U-shape or the C-shape or the V-shape, respectively, and wherein the intermediate section forms a base of the U-shape or the C-shape or the V-shape, respectively.

Example Ex5: Article according to any one of the preceding examples, wherein the intermediate section is symmetrically located between the first soaking section and the second soaking section.

Example Ex6: Article according to any one of the preceding examples, wherein the first soaking section is located at least partially at a first end portion of the filament bundle.

Example Ex7: Article according to any one of the preceding examples, wherein the second soaking section is located at least partially at a second end portion of the filament bundle.

Example Ex8: Article according to any one of the preceding examples, further comprising an aerosol-forming liquid contained in the liquid reservoir.

Example Ex9: Article according to any one of the preceding examples, wherein the liquid reservoir comprises a first compartment and a second compartment.

Example Ex10: Article according to example Ex9, wherein the first soaking section is arranged at least partially in the first compartment and the second soaking section is arranged at least partially in the second compartment.

Example Ex11: Article according to any one of examples Ex9 or Ex10, wherein the first compartment is fluidly separated from the second compartment.

Example Ex12: Article according to any one of examples Ex9 to Ex11, further comprising a first aerosol-forming liquid contained in the first compartment, and a second aerosol-forming liquid contained in the second compartment.

Example Ex13: Article according to any one of the preceding examples, wherein at least part of one of the intermediate section, the first soaking section and the second soaking section is bunched by a ferrule or a bushing or harness.

Example Ex14: Article according to example Ex13, wherein the ferrule or the bushing or the harness comprises a sheath member.

Example Ex15: Article according to any one of the preceding examples, wherein the number of fibers in the first soaking section is different from the number of fibers in the second soaking section.

Example Ex16: Article according to any one of the preceding examples, wherein a surface property of the filaments in the first soaking section is different from a surface property of the filaments in the second soaking section.

Example Ex17: Article according to any one of the preceding examples, wherein a length of the first soaking section is different from a length of the second soaking section.

Example Ex18: Article according to any one of the preceding examples, wherein the first soaking section has a length of at most 10 percent, 20 percent, 30 percent, 40 percent, 50 percent, 60 percent, of the total length of the filament bundle.

Example Ex19: Article according to any one of the preceding examples, wherein the second soaking section has a length of at most 10 percent, 20 percent, 30 percent, 40 percent, 50 percent, 60 percent, of the total length of the filament bundle.

Example Ex20: Article according to any one of the preceding examples, wherein the intermediate section has a length of at least 5 percent, 10 percent, 20 percent, 30 percent, 40 percent, 50 percent, 60 percent, 70 percent, or 80 percent of the total length of the filament bundle.

Example Ex21: Article according to any one of the preceding examples, wherein the intermediate section has a length of at most 10 percent, 20 percent, 30 percent, 40 percent, 50 percent, 60 percent, 70 percent, 80 percent, 90 percent or 100 percent of the total length of the filament bundle.

Example Ex22: Article according to any one of the preceding examples, wherein in the intermediate section, the mean center-to-center distance between adjacent filaments is at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex23: Article according to any one of the preceding examples, wherein a total length of the filament bundle is in a range between 5 millimeter and 70 millimeter, in particular between 10 millimeter and 60 millimeter, preferably between 20 millimeter and 50 millimeter.

Example Ex24: Article according to any one of the preceding examples, wherein the filament bundle comprises a fan-out portion at at least one of a first end portion and a second end portion of the filament bundle, in which the filaments diverge from each other.

Example Ex25: Article according to example Ex24, wherein the fan-out portion has a length of at least 5 percent, 10 percent, 20 percent, or 30 percent of a total length of the filament bundle.

Example Ex26: Article according to any one of examples Ex24 or Ex25, wherein the fan-out portion has a length of at most 10 percent, 20 percent, 30 percent, 40 percent of a total length of the filament bundle.

Example Ex27: Article according to any one of the preceding examples, wherein the filament bundle comprise an expanded portion in which the mean center-to-center distance between the filaments is larger than in other portions of the filament bundle along its length extension.

Example Ex28: Article according to example Ex27, wherein the expanded portion is part of the intermediate section, or wherein the intermediate portion is part of the expanded portion.

Example Ex29: Article according to any one of the preceding examples, wherein the filament bundle comprises a plurality of first filaments including a first susceptor material.

Example Ex30: Article according to example Ex29, wherein the plurality of first filaments are solid material filaments.

Example Ex31: Article according to any one of examples Ex29 or Ex30, wherein the plurality of first filaments are single grade material filaments.

Example Ex32: Article according to any one of examples Ex29 to Ex31, wherein the plurality of first filaments are made of the first susceptor material.

Example Ex33: Article according to any one of examples Ex29 to Ex32, wherein the first susceptor material comprises or is made of one of a ferrimagnetic material, or a ferromagnetic material, or an electrically conductive material, or electrically conductive ferrimagnetic material or electrically conductive ferromagnetic material.

Example Ex34: Article according to any one of examples Ex29 to Ex33, wherein the first susceptor material comprises or is made of one of a ferrite, aluminum, iron, nickel, copper, bronze, cobalt, a nickel alloy, plain-carbon steel, stainless steel, ferritic stainless steel, ferromagnetic stainless steel, martensitic stainless steel, or austenitic stainless steel.

Example Ex35: Article according to any one of examples Ex29 to Ex34, wherein the plurality of first filaments have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

Example Ex36: Article according to any one of examples Ex29 to Ex35, wherein the plurality of first filaments have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex37: Article according to any one of examples Ex29 to Ex36, wherein the plurality of first filaments have a circular, ellipsoidal, an oval, a triangular, a rectangular, a quadratic, a hexagonal or a polygonal cross-section.

Example Ex38: Article according to any one of examples Ex29 to Ex37, wherein the plurality of first filaments are surface treated, in particular comprise a surface coating, for example, an aerosolization enhancing surface coating, a liquid-adhesive surface coating, a liquid repellent surface coating, or an antibacterial surface coating.

Example Ex39: Article according to any one of examples Ex29 to Ex38, wherein the plurality of first filaments in the filament bundle comprises 3 to 100 first filaments, in particular 10 to 80 first filaments, preferably 20 to 60 first filaments, more preferably 30 to 50 first filaments, for example 40 first filaments.

Example Ex40: Article according to any one of examples Ex29 to Ex39, wherein the filament bundle further comprises a plurality of second filaments including a second susceptor material.

Example Ex41: Article according to example 40, wherein the second susceptor material comprises one of a ferrimagnetic material or a ferromagnetic material.

Example Ex42: Article according to any one of examples Ex40 or Ex41, wherein the second susceptor material has a Curie temperature below 500 degree Celsius, in particular below 350 degree Celsius, preferably below 300 degree Celsius, more preferably below 250 degree Celsius, even more preferably below 200 degree Celsius, most preferably below 150 degree Celsius.

Example Ex43: Article according to any one of examples Ex40 to Ex42, wherein the second susceptor material comprises one of nickel, a nickel alloy, mu-metal or permalloy Example Ex44: Article according to any one of examples Ex40 to Ex43, wherein the plurality of second filaments are solid material filaments.

Example Ex45: Article according to any one of examples Ex40 to Ex44, wherein the plurality of second filaments are single grade material filaments.

Example Ex46: Article according to any one of examples Ex40 to Ex45, wherein the plurality of second filaments are made of the second susceptor material.

Example Ex47: Article according to any one of examples Ex40 to Ex46, wherein the plurality of second filaments are surface treated, in particular comprise a surface coating, for example, an aerosolization enhancing surface coating, a liquid-adhesive surface coating, a liquid repellent surface coating, or an antibacterial surface coating.

Example Ex48: Article according to any one of examples Ex40 to Ex47, wherein at least one of, in particular each of the plurality of second filaments has a circular, an ellipsoidal, an oval, a triangular, a rectangular, a quadratic, a hexagonal or a polygonal cross-section.

Example Ex49: Article according to any one of examples Ex40 to Ex48, wherein the plurality of second filaments have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

Example Ex50: Article according to any one of examples Ex40 to Ex49, wherein the plurality of second filaments have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex51: Article according to any one of examples Ex40 to Ex50, wherein the plurality of first filaments and the plurality of second filaments have the same diameter.

Example Ex52: Article according to any one of examples Ex40 to Ex50, wherein the plurality of first filaments and the plurality of second filaments have a different diameter.

Example Ex53: Article according to any one of examples Ex40 to Ex52 wherein the plurality of second filaments in the filament bundle comprises 1 to 100 second filaments, in particular 10 to 80 second filaments, preferably 20 to 60 second filaments, more preferably 30 to 50 second filaments, for example 40 second filaments.

Example Ex54: Article according to any one of examples Ex40 to Ex53, wherein the plurality of first filaments and the plurality of second filaments are substantially equally distributed throughout the filament bundle.

Example Ex55: Article according to any one of examples Ex40 to Ex53, wherein the plurality of first filaments and the plurality of second filaments are unequally distributed throughout the filament bundle.

Example Ex56: Article according to any one of examples Ex40 to Ex55, wherein a length of the plurality of second filaments is different from a length of the plurality of first filaments.

Example Ex57: Article according to any one of examples Ex40 to Ex56, wherein a length of the plurality of second filaments is shorter than the length of the plurality of first filaments. Example Ex58: Article according to any one of examples Ex40 to Ex56, wherein a length of the plurality of second filaments is larger than the length of the plurality of first filaments.

Example Ex59: An aerosol-generating system comprising an inductively heating aerosol-generating device, an aerosol-generating article according to any one of the preceding examples for use with the aerosol-generating device, the device comprising:

- a receiving cavity for removably receiving the aerosol-generating article;
- at least one induction source configured and arranged to generate an alternating magnetic field in the intermediate section of the filament bundle when the article is received in the receiving cavity.

Example Ex60: The aerosol-generating system according to example Ex59, wherein the induction source comprises an induction coil arranged around the receiving cavity, in particular around the intermediate section of the filament bundle when the article is received in the receiving cavity.

Examples will now be further described with reference to the figures in which:

FIG. 1 schematically illustrates a first exemplary embodiment of an aerosol-generating article according to the present invention;

Figure 1:
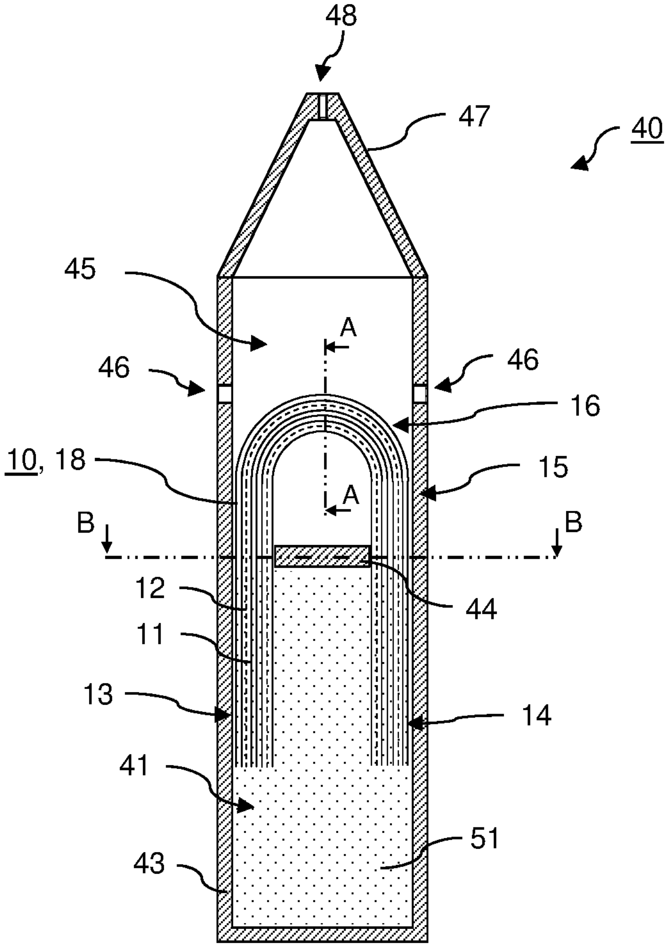
Figure 4:
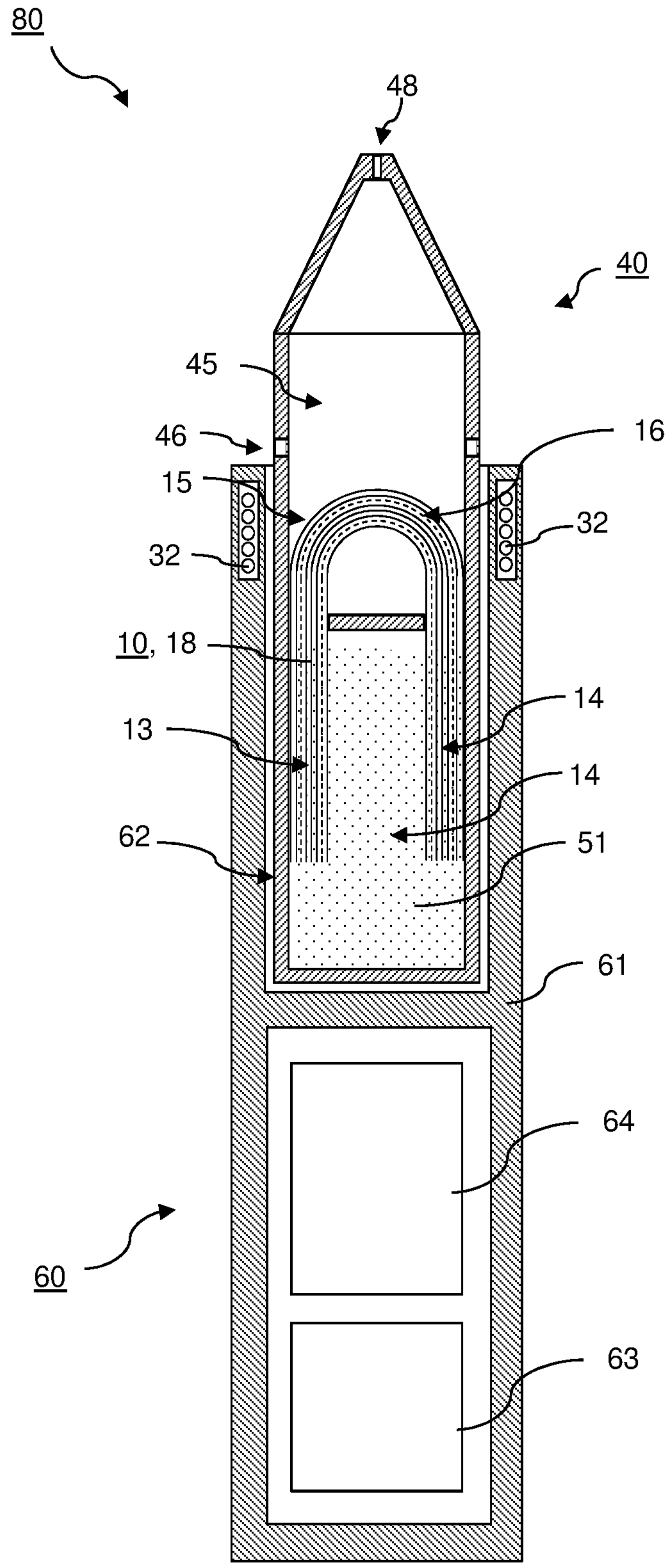
Figure 5:
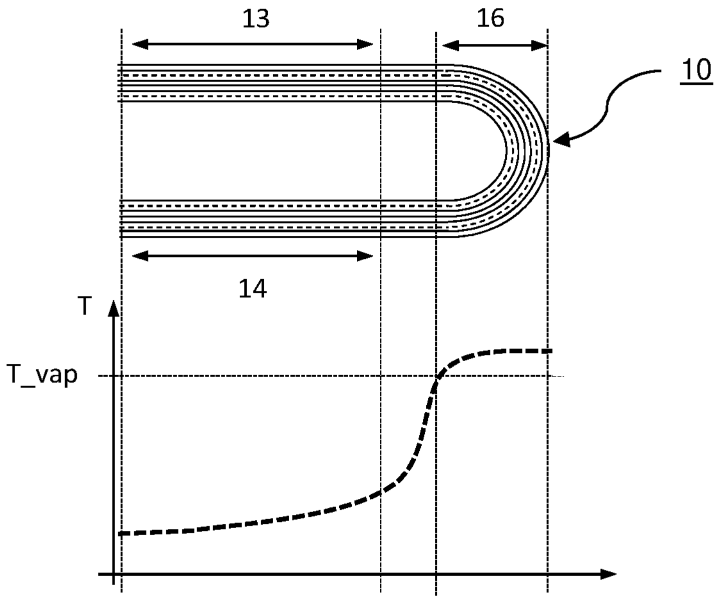
Figure 6:
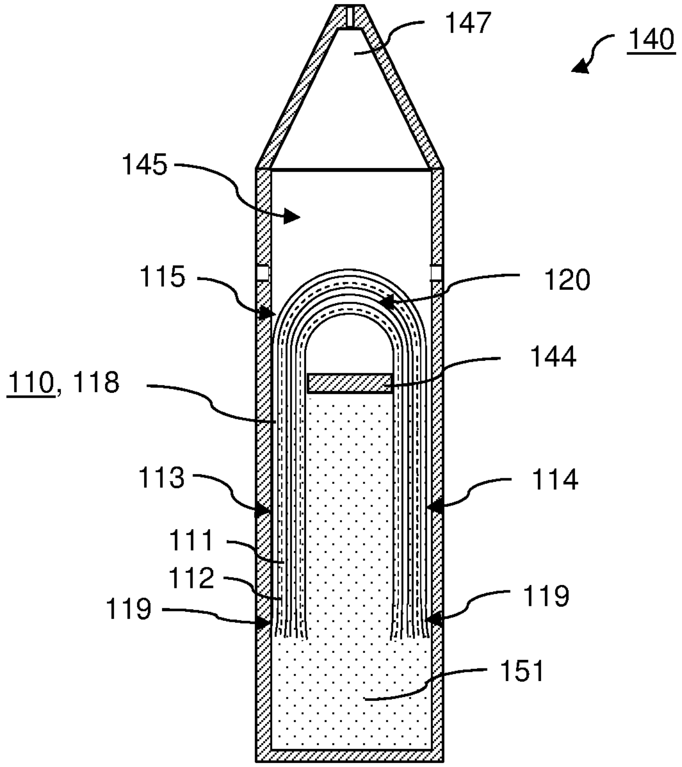
Figure 7:
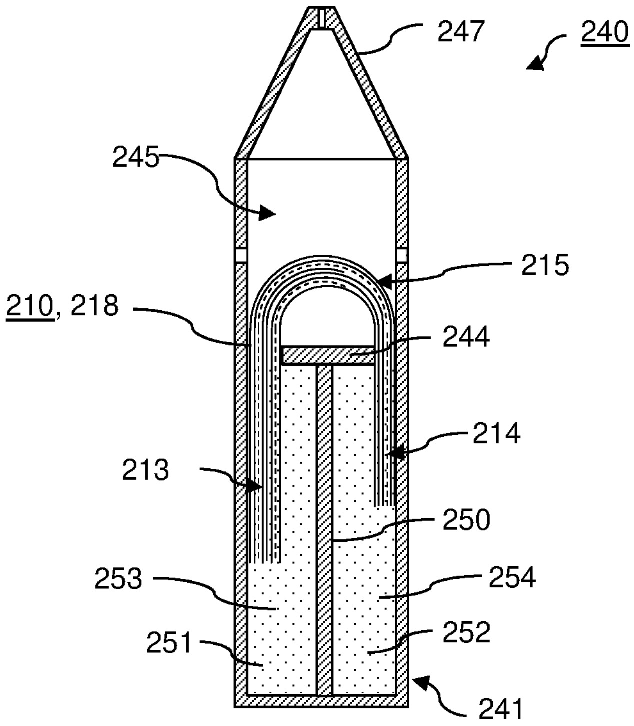
Figure 8:
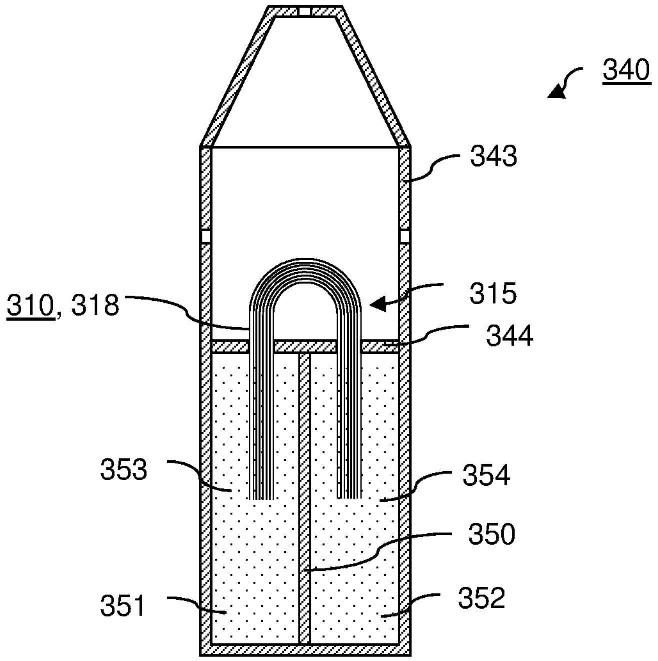

FIG. 4 schematically illustrates an exemplary embodiment of an aerosol-generating system according to the present invention comprising an aerosol-generating device and an aerosol-generating article according to FIG. 1;

FIG. 5 shows a temperature profile along the susceptor assembly in use of the aerosol-generating system according to FIG. 4;

FIG. 6 schematically illustrates a second exemplary embodiment of an aerosol-generating article according to the present invention;

FIG. 7 schematically illustrates a third exemplary embodiment of an aerosol-generating article according to the present invention; and FIG. 8 schematically illustrates a fourth exemplary embodiment of an aerosol-generating article according to the present invention.

FIG. 1 schematically illustrates an aerosol-generating article 40 according to a first exemplary embodiment of the present invention. As will be described further below with regard to FIG. 5, the aerosol-generating article 40 is configured for use with an inductively heating aerosol-generating device. The article comprises 40 comprises a substantially cylindrical article housing 43 made of a liquid impermeable rigid material, for example PP (polypropylene). The article further comprises a substantially disc-shaped bushing 44 that is arranged within the article housing 43 at about half way of the length extension of the article 40. The bushing 44 separates the inner void of the article housing 43 into two portions, namely, a liquid reservoir 41 which contains an aerosol-forming liquid 51 and a vaporization cavity 45. As can be seen in FIG. 1, the disc-like bushing 44 comprises two openings each of which forms an outlet of the liquid reservoir 41.

According to the invention, the article 40 further comprises a liquid-conveying susceptor assembly 10 including a curved filament bundle 18. In general, the susceptor assembly 10 comprises a filament bundle 18 which is capable to perform two functions: conveying and heating aerosol-forming liquid. For that purpose, the filament bundle 18 comprises a plurality of first filaments 11 and a plurality of second filaments 12, wherein the plurality of first filaments 11 comprise a first susceptor material and the plurality of second filaments 12 comprise a second susceptor material. Due to the susceptive nature of the filament materials, the first filaments 11 and the second filaments 12 are capable to be inductively heated in an alternating magnetic field and thus to heat an aerosol-forming liquid in thermal contact with the filaments. Furthermore, due to the arrangement of the first and second filaments 11, 12 in the filament bundle 18 and due to the small diameter of the filaments 11, 12, the filament bundle 18 comprises narrow channels which are formed between the filaments 11, 12 and which provide capillary action along the length extension of the filament bundle 18.

In the present embodiment, the filament bundle 18 is curved. More particularly, the filament bundle 18 is substantially U-shaped having two arms and a base that is symmetrically arranged between both arms. Each of the two arms of the U-shaped filament bundle 18 passes through one of the two openings in the bushing 44 such as to be partially arranged in the liquid reservoir 41 and partly arranged in the vaporization cavity 45. Due to this, the filament bundle 18 is capable to conveying aerosol-forming liquid 51 from the liquid reservoir 41 through the outlet into a region outside the liquid reservoir 41, that is, into the vaporization cavity 45. Accordingly, that parts of the filament bundle 18 which are arranged in the liquid reservoir 41, in particular immersed into the aerosol-forming liquid 51 act as a first soaking section 13 and a second soaking section 14.

In contrast, the intermediate section 15 of the filament bundle 18 which is arranged between the first soaking section 13 and the second soaking section 14 outside the liquid reservoir 41 may act at least partially as a heating section 16 for vaporizing aerosol-forming liquid 51 by exposing that part to an alternating magnetic field to inductively heating the filaments 12, 13. Preferably, the base, that is, the apex of the U-Shaped filament bundle 18 is used as heating section 16 for vaporizing aerosol-forming liquid 51 which is conveyed from both arms of the U-Shaped filament bundle 18 towards the intermediate section 15. In the vaporization cavity 45, the vaporized aerosol-forming liquid may be exposed to an air path to be drawn out as an aerosol.

The length of the first and the second soaking section 13, 14 may be advantageously used to a control the amount of aerosol-forming liquid being soaked and conveyed from the liquid reservoir 41 into the vaporization cavity 45. In the present embodiment, each soaking section 13, 14 has a length of about 30% of the total length of the filament bundle 18.

Figure 2:
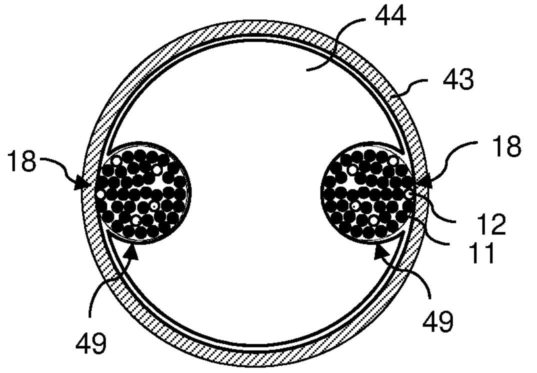
FIG. 2 shows a cross-section through the aerosol-generating article according to FIG. 1 along line B-B.

At least along the intermediate section 15, the plurality of filaments 11, 12 are arranged parallel to each other. As such, the intermediate section 15 is defined as that part of the filament bundle 18 which is located outside the liquid reservoir 41 between first and second soaking section 13, 14 and in which the plurality of filaments 11, 12 are arranged parallel to each other. That is, an intermediate portion 15, the filament bundle 18 is an unstranded filament bundle in which the first and the second filaments 11, 12 are neither stranded nor twisted and thus do not cross each other. Preferably, the plurality of filaments 11, 12 are arranged parallel to each other in the first and the second soaking section, too. The parallel arrangement is particularly advantageous to provide sufficient and uniform capillary action along the entire length extension along the intermediate section 15. Furthermore, a susceptor assembly comprising a parallel arrangement of filaments is easy and cost-effective to manufacture. Basically, the susceptor assembly 10 may be manufactured by bundling a plurality of individual filaments arranged in substantially parallel order along a certain length section, that is, the intermediate section, and cutting the filament bundle to desired length. In the embodiment according to FIG. 1, the filaments 11, 12 are kept together in the parallel configuration by passing through the openings in the bushing 44. With reference to FIG. 2 showing a cross-section through the aerosol-generating article according to FIG. 1 along line B-B, the openings through the bushing 44 are formed as jaw-like notches 49 which are open towards the inner surface of the cylindrical article housing 43 such that the filaments 11, 12 are bundled by the jaw-like notches 49 and at the same time clamped between the bushing 44 and the inner surface of the cylindrical article housing 43.

Figure 3:
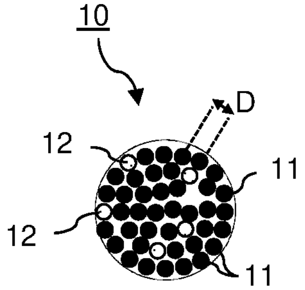
FIG. 3 shows a cross-section through the susceptor assembly of the aerosol-generating article according to FIG. 1 along line A-A.

FIG. 3 shows a cross-section of the susceptor assembly 10 through the filament bundle 18 along line A-A in FIG. 1, that is, through the intermediate section 15. Both, the plurality of first filaments 11 and the plurality of second filaments 12 are solid material filaments having a substantially circular cross-section. Due to the circular cross-section, the filaments 11, 12 are not in area contact, but only in a line contact with each other causing the formation of capillary spaces between the pluralities of filaments 11,12 on its own. Other cross-sectional shapes of the plurality of first and second filaments 11, 12 of are also possible, for example, oval, elliptical triangular rectangular, quadratic, hexagonal or polygonal cross-sections.

In order to provide a sufficient capillary action, the mean center-to-center distance D between adjacent filaments 11, 12 in the filament bundle is at most 0.5 millimeter, in particular at most 0.25 millimeter, preferably at most at most 0.1 millimeter at most 0.05 millimeter, even more preferably at most 0.025 millimeter.

The capillary action is promoted also by a small radius of curvature, and thus by a small diameter of the first and second filaments 11, 12. Accordingly, the first and second filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. However, the diameter of the first and second filaments 11, 12 should be still larger than twice the skin depth in order to induce a sufficient amount of eddy currents and thus to generate a sufficient amount of heat energy when the filament bundle 18 is exposed to an alternating magnetic field. Accordingly, depending on the materials and the frequency of the alternating magnetic field used, the first and second filaments 11, 12 may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

In the present embodiment, the first and second filaments 11, 12 comprise a liquid-adhesive surface coating (not shown). The liquid adhesive surface coating further enhances capillary action of the filament bundle 18.

The first susceptor material of the plurality of first filaments 11 is optimized with regard to heat generation. For example, the first susceptor material may be a ferromagnetic stainless steel causing the plurality of first filaments 11 to be inductively heated by eddy currents as well as by hysteresis losses. The Curie temperature of the ferromagnetic first susceptor material is chosen such as to be well above the vaporization temperature, preferably above 300 degree Celsius. In contrast, as described further above, the plurality of second filaments 12 mainly serve as temperature markers. For that purpose, the second susceptor material may be a ferromagnetic or ferrimagnetic material which preferably has a Curie temperature at about a predefined operating temperature of the susceptor assembly 10. Accordingly, when the susceptor assembly 10 reaches the Curie temperature of the second susceptor material, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source 30 that is used to generate the alternating magnetic field it can be detected when the second susceptor material has reached its Curie temperature and, thus, when the predefined operating temperature has been reached. Suitable materials for the second susceptor material may be nickel, a nickel alloy, mu-metal or permalloy. To sufficiently work as temperature markers, only a few second filaments are required. Accordingly, the number of first filaments 11 may be larger, in particular two times or three times or four times or five times or six times or seven times or eight times or nine times or ten times larger than the number of second filaments 12. In the present embodiment, the filament bundle 18 exemplarily comprises forty first filaments 11 and five second filaments 12.

As can be also seen in FIG. 3, the plurality of second filaments 12 are randomly distributed throughout the filament bundle 18. Advantageously, a random distribution requires only little effort during manufacturing of the filament bundle 18. As can be further seen in FIG. 3, the filament bundle 18 has a substantially circular cross-section which is particularly easy to manufacture.

Again with reference to FIG. 1, the article 40 comprises air inlets 46 through the article housing 43 into the vaporization cavity 45 enabling air to enter into the vaporization cavity 45. The air inlet 46 may be configured to provide airflow at or around the heating section 16 of the filament bundle 18. The air inlet 46 may be a hole through the reservoir body. Likewise, the air inlet 46 may be a nozzle that is configured to direct airflow to a specific target location at the filament bundle 18. In addition, the article 40 comprises a mouthpiece 47 forming the proximal end portion of the vaporization cavity 45. The mouthpiece 47 has a tapered shape including an air outlet 48 at its very end, thus allowing a user to directly inhale an aerosol from the article. Preferably, the mouthpiece comprises a filter (not shown). Hence, when a user takes a puff, aerosol-forming liquid vaporized from the heating section 17 is exposed to the airflow having entered the vaporization cavity 45 through the air inlets 46 such as to form an aerosol which may be drawn out through the air outlet 48 in the mouthpiece 47.

In general, the aerosol-generating article 40 may be an aerosol-generating article for single use or an aerosol-generating article for multiple uses. In the latter case, the aerosol-generating article 40 may be refillable. That is, the liquid reservoir 41 may be refillable with aerosol-forming liquid 51 after depletion.

FIG. 4 schematically illustrates an aerosol-generating system 80 according to an exemplary embodiment of the present invention. The system 80 comprises an aerosol-generating article 40 as shown in FIG. 1 as well as an electrically operated aerosol-generating device 60 that is capable of interacting with the article 40 in order to generate an aerosol. For this, the aerosol-generating device 60 comprises a receiving cavity 62 formed within the device housing 61 at a proximal end of the device 60. The receiving cavity 62 is configured to removably receive at least a portion of the aerosol-generating article 40. The aerosol-generating device is further configured to inductively heat the susceptor assembly 10 in a heating section 16 of the filament bundle 18 in order to vaporize aerosol-forming liquid 51 that is conveyed from the first and the second soaking section 13, 14 to the intermediate portion 15 of the filament bundle 18.

For heating the susceptor assembly 10, the aerosol-generating device 60 comprises an induction source including an induction coil 32. In the present embodiment, the induction coil 32 is a single helical coil which is arranged and configured to generate a substantially homogeneous alternating magnetic field within the receiving cavity 62. As can be seen in FIG. 4, the induction coil 32 is arranged around the proximal end portion of the receiving cavity 62 such as to only surround the base portion of the U-shaped filament bundle 18 when the aerosol-generating article 40 is received in the receiving cavity 62. Accordingly, in use of the device 60, the induction coil 32 generates an alternating magnetic field that only penetrates at least partially the intermediate section 15, that is, the heating section 16 in the vaporization cavity 45 of the article 40. In contrast, due to the local heating, the first and the second soaking sections 16 of the filament bundle 18 stay at temperatures below the vaporization temperature. Thus, boiling of aerosol-forming liquid 51 within the liquid reservoir 41 is prevented.

As a consequence, in use the susceptor assembly 10 comprises a temperature profile along the length extension of the article with sections of higher and lower temperatures as shown in FIG. 5. More specifically, the temperature profile shows a temperature increase from temperatures below a vaporization temperature T_vap of the aerosol-forming liquid at the first and the second soaking sections 13, 14 to temperatures above the respective vaporization temperature in the heating section 16 at the base portion of the filament bundle 18.

The actual temperature profile forming up in use of the susceptor assembly 10 depends on the thermal conductivity and the length of the filament bundle 18. Accordingly, in order to have sufficient temperature gradient between the soaking sections 13, 14 and the heating section, a certain total length of the filament bundle is required. With regard to the present embodiment, the total length of the U-shaped filament bundle 18 form the very end of arms 13, 14 to the very end at the base of the U-shaped filament bundle 18 may be in a range between 5 millimeter and 50 millimeter, in particular between 10 millimeter and 40 millimeter, preferably between 10 millimeter and 30 millimeter, more preferably between 10 millimeter and 20 millimeter.

Together, the induction source of the aerosol-generating device 60 and the susceptor assembly 10 of the aerosol-generating article 44 form an inductive heating assembly.

The aerosol-generating device 60 further comprises a controller 64 for controlling operation of the aerosol-generating system 80, in particular for controlling the heating operation.

Furthermore, the aerosol-generating device 60 comprises a power supply 63 providing electrical power for generating the alternating magnetic field. Preferably, the power supply 63 is a battery such as a lithium iron phosphate battery. The power supply 63 may have a capacity that allows for the storage of enough energy for one or more user experiences.

Both, the controller 64 and the power supply 63 arranged in a distal portion of the aerosol-generating device 60.

FIG. 6 schematically illustrates a second exemplary embodiment of an aerosol-generating 140 article according to the present invention. In general, the aerosol-generating article 140 according to FIG. 6 is very similar to the aerosol-generating article 40 shown in FIG. 1 and FIG. 4. Therefore, identical or similar features are denoted with the same reference signs, yet incremented by 100. In contrast to the first embodiment shown in FIGS. 1 and 4, the susceptor assembly 110 of the aerosol-generating article 140 according to FIG. 6 comprises a fan-out portion 190 at each end of the soaking sections 113, 114. In the fan-out portions 190, the first filaments 111 and second filaments 112 diverge from each other in order to facilitate conveyance of aerosol-forming liquid.

In addition, the filament bundle 118 comprises an expanded portion 120 in which the mean center-to-center distance between the filaments 11, 112 larger than in other portions of the filament bundle 118. In particular, the expanded portion is part of the intermediate section 115 in order to facilitate the exposure of the vaporized aerosol-forming liquid into the air path and thus to facilitate the formation of an aerosol.

FIG. 7 schematically illustrates a third exemplary embodiment of an aerosol-generating 240 article according to the present invention. Again, the aerosol-generating article 240 according to FIG. 6 is very similar to the aerosol-generating article 40 shown in FIG. 1 and FIG. 4. Therefore, identical or similar features are denoted with the same reference signs, yet incremented by 200. In contrast to the first embodiment shown in FIGS. 1 and 4, the susceptor assembly 110 of the aerosol-generating article 240 according to FIG. 7 comprises a separation wall 250 which separates the liquid reservoir 241 into a first compartment 253 and a second compartment 254. The separation wall 250 is arranged and configured such that the first compartment 253 is fluidly separated from the second compartment 254. This enables to separately store a respective aerosol-forming liquid in each of the compartments without the aerosol-forming liquids mixing with each other. In the present embodiment, the article 240 comprises a first aerosol-forming liquid 251 contained in the first compartment 253, and a second aerosol-forming liquid 252 contained in the second compartment 254. Preferably, the first aerosol-forming liquid is different from the second aerosol-forming liquid. As the first soaking section and the second soaking section both convey the respective aerosol-forming liquid into the intermediate portion of the filament bundle, the susceptor assembly may be advantageously used to convey and vaporize different types of aerosol-forming liquids at the same time. Advantageously, this enhances the variety of a user's experience. It is also possible that the first aerosol-forming liquid and the second aerosol-forming liquid are the same.

The variety of the user's experience user's may be further enhanced when the first soaking section 13 and the second soaking section 14 differ from each other in at least one property. This may enable to control the respective amount of aerosol-forming liquid conveyed from first compartment 253 and the second compartment 254 and thus to control the composition of the aerosol.

For example, as shown in FIG. 7, the length of the first soaking section 213 may be different from, here shorter than, a length of the second soaking section 214 causing different amounts of the first and second aerosol-forming liquid 251, 252 to be conveyed from the first compartment 253 and the second compartment 254 to the intermediate portion 215.

As can be further seen in FIG. 7, the number of fibers in the first soaking section 213 is different from, here larger than, the number of fibers in the second soaking section 2014. Due the difference in the number of filaments, the first soaking section and the second soaking section have different liquid conveying capacities which also results in different amounts of aerosol-forming liquid 251, 252 been conveyed from the first compartment 253 and the second compartment 254 to the intermediate portion 215.

Alternatively or in addition, a surface property of the filaments in the first soaking section 213 may be different from a surface property of the filaments in the second soaking section 214 (not shown). For example, the filaments in the first soaking section 213 may comprise a liquid-adhesive surface coating that is different from a liquid-adhesive surface coating of the filaments in the second soaking section 214, resulting in different adhesion strength between the respective aerosol-forming liquid 251, 252 and the filaments of the respective soaking section 213, 214.

Furthermore, the bundling of the fibers in the left arm of the U-shaped filament bundle 218 shown in FIG. 7, including the first soaking section 213 may be different from the bundling of the fibers in the right arm of the U-shaped filament bundle 218 including the second soaking section 214. A different bundling may result in different bundling strength and thus in different center-to center distance is between the fibers which may also it is a difference in the liquid conveying capacity between the ride and the left arm of the U-shaped filament bundle 218.

FIG. 8 schematically illustrates a fourth exemplary embodiment of an aerosol-generating 340 article according to the present invention. The aerosol-generating article 340 according to FIG. 8 is very similar to the aerosol-generating article 240 shown in FIG. 7. Therefore, identical or similar features are denoted with the same reference signs, yet incremented by 100. in contrast to the third embodiment shown in FIG. 7, the U-shaped filament bundle 318 of the aerosol-generating article 340 according to FIG. 8 is not clamped between the bushing and inner surface of the article housing. Instead, each of the arms of the U-shaped filament bundle 318 passes through a respective aperture (opening) in the bushing 344. Accordingly, the first soaking section 313 and the second soaking section 314 extend rather centrically into the first compartment 353 and the second compartment 354, respectively. As a consequence, immersion of the first soaking section 313 and the second segment section 314 in the first aerosol-forming liquid 351 and the second aerosol-forming liquid 352 is improved.

In addition, the configuration according to FIG. 8 allows for a pre-installation of the filament bundle 318 in the bushing 344 which both may be subsequently inserted into the article housing 343. Different diameters of the respective aperture (opening) may be used to realize different handling strings of the two arms of the U-shaped filament bundle 318 and, thus, to realize different liquid conveying capacities between the two arms.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating article for an inductively heatable aerosol-generating device, the aerosol-generating article comprising:

a liquid reservoir configured to store aerosol-forming liquid; and a liquid-conveying susceptor assembly configured to convey the aerosol-forming liquid from the liquid reservoir into a region outside the liquid reservoir and for inductively heating the aerosol-forming liquid under an influence of an alternating magnetic field to generate an aerosol, the liquid-conveying susceptor assembly comprising a filament bundle of a plurality of inductively heatable filaments, the filament bundle comprising a first soaking section, a second soaking section, and an intermediate section between the first soaking section and the second soaking section, wherein the first soaking section and the second soaking section are each arranged at least partially in the liquid reservoir and the intermediate section is arranged in a region outside the liquid reservoir, wherein along at least the intermediate section the plurality of inductively heatable filaments are arranged parallel to each other, and wherein the first soaking section and the second soaking section differ from each other in at least one of a number of fibers in the respective soaking section, a surface property of the filaments in the respective soaking section, or a length of the respective soaking section.

2. The aerosol-generating article according to claim 1, wherein the filament bundle is substantially U-shaped or C-shaped or V-shaped.

3. The aerosol-generating article according to claim 2, wherein the first soaking section and the second soaking section each form at least partially an arm of the U-shape or the C-shape or the V-shape, respectively, and wherein the intermediate section forms a base of the U-shape or the C-shape or the V-shape, respectively.

4. The aerosol-generating article according to claim 1, wherein the first soaking section is located at least partially at a first end portion of the filament bundle, and wherein the second soaking section is located at least partially at a second end portion of the filament bundle.

5. The aerosol-generating article according to claim 1, wherein the liquid reservoir comprises a first compartment and a second compartment, and wherein the first soaking section is arranged at least partially in the first compartment and the second soaking section is arranged at least partially in the second compartment.

6. The aerosol-generating article according to claim 5, wherein the first compartment is fluidly separated from the second compartment.

7. The aerosol-generating article according to claim 1, wherein the first soaking section has a length of at most 10 percent, or 20 percent, or 30 percent, or 40 percent, or 50 percent, or 60 percent, of a total length of the filament bundle, and wherein the second soaking section has a length of at most 10 percent, or 20 percent, or 30 percent, or 40 percent, or 50 percent, or 60 percent, of the total length of the filament bundle.

8. The aerosol-generating article according to claim 1, wherein the intermediate section has a length of at most 10 percent, or 20 percent, or 30 percent, or 40 percent, or 50 percent, or 60 percent, or 70 percent, or 80 percent, or 90 percent, or 100 percent of a total length of the filament bundle.

9. The aerosol-generating article according to claim 1, wherein the filament bundle further comprises an expanded portion in which a mean center-to-center distance between filaments of the plurality of inductively heatable filaments is larger than in other portions of the filament bundle along a length extension of the filament bundle.

10. The aerosol-generating article according to claim 1, wherein the filament bundle further comprises a plurality of first filaments including a first susceptor material, and a plurality of second filaments including a second susceptor material, and wherein the second susceptor material comprises a ferrimagnetic material or a ferromagnetic material.

11. An aerosol-generating system, comprising:

an inductively heatable aerosol-generating device; and an aerosol-generating article according to claim 1 for the inductively heatable aerosol-generating device, the inductively heatable aerosol-generating device comprising:

a receiving cavity configured to removably receive the aerosol-generating article, and at least one induction source configured and arranged to generate an alternating magnetic field in the intermediate section of the filament bundle when the aerosol-generating article is received in the receiving cavity.

12. The aerosol-generating system according to claim 11, wherein the at least one induction source comprises an induction coil arranged around the receiving cavity.

13. The aerosol-generating system according to claim 12, wherein the induction coil is arranged around the intermediate section of the filament bundle when the aerosol-generating article is received in the receiving cavity.

* * * * *